UNITED STATES PATENT OFFICE.

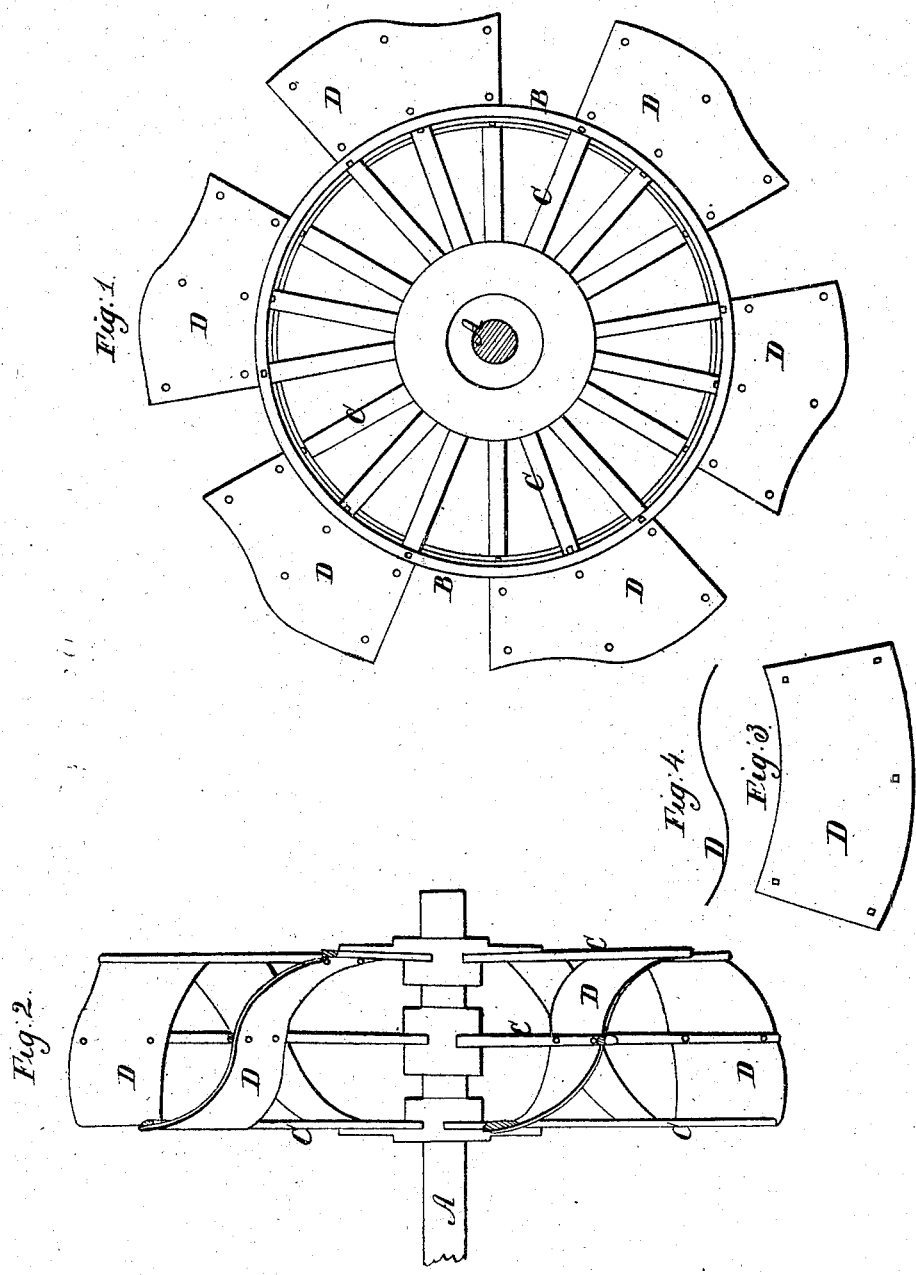

ABRAHAM VAN ANTWERP, OF ALBANY, NEW YORK.

PADDLE-WHEEL.

Specification of Letters Patent No. 11,394, dated July 25, 1854.

*To all whom it may concern:*

Be it known that I, ABRAHAM VAN ANTWERP, of the city of Albany, in the county of Albany and State of New York, have invented a certain new and useful Improvement in Paddle-Wheels; and I do hereby declare that the following is a full, clear, and exact description of the same, reference being had to the accompanying drawing, forming part of this specification, in which—

Figure 1, is a side view of the paddle; Fig. 2, an edge view thereof; Fig. 3, a face view of one of the floats; and Fig. 4, an edge view of the same.

The same letters of reference denote corresponding parts throughout the several figures.

My invention has reference to the floats forming the paddle, and it consists in making them of "cyma-recta" and "cyma reversa" form and setting them obliquely on the wheel, whereby an easy entrance is given to the floats, lift or back water obviated and the effect of resistance made to approximate the line of propulsion.

For the benefit of all others whom it may concern I will proceed fully to describe my invention.

A is the paddle shaft, B the outer rings and C the arms carrying the floats D, which are blades of "cyma-recta" form on their faces and "cyma reversa" shape on their backs, and so set or affixed obliquely to the wheel as that, during the forward motion of the vessel, they act upon the water to throw it outward, at varying angles, from either side of the ship, somewhat similar to the effect produced by the ordinary oblique straight float, but possessing great advantages over that form while the disadvantages attendant upon the straight radial float, on entering and leaving the water, are entirely obviated, for, it will be observed, from the ogee shape of the float D, that its ends present almost straight edges to the water on entering and leaving it, and form much more gradual angles of resistance for a considerable distance from either end of the float than is obtainable by the ordinary straight oblique one, while the center of it more closely (though by a gradual and easy change of line or lines) approximates, in its surface exposed to resistance, the common straight radial float; thus, on entering the water, the effect of the paddle, in striking, to depress it, is reduced, as also is the lift, or tendency, on leaving, to make "backwater," while the center, and larger, surface of the float operates upon the water at but a slightly deviating angle from the line of propulsion, and, as found by experiment, the whole expenditure of power transmitted to the wheels, is returned (less friction of machinery) in available propelling force without any shock on the vessel or violent agitation of the water. On reversing the motion of the paddles a similar action is produced by the "cyma reversa" shape of the back of the floats, but, instead of throwing the water from, it is thrown, at varying angles toward the sides of the vessel.

What I claim as my invention and improvement and desire to secure by Letters Patent is—

The construction and use upon steamboat paddle wheels of disconnected floats of a cyma recta and cyma reversa form as shown in Fig. 1, the same being placed upon arms set obliquely upon the shaft, and being so formed and placed that the end of the float enters and leaves the water on a line parallel with the direction of the vessel, whereby the beating down of the water by the float when entering and the raising up of water when leaving as in the ordinary transverse paddle is prevented.

In testimony whereof I have hereunto signed my name before two subscribing witnesses.

A. VAN ANTWERP.

Witnesses:
 JOHN W. PITTS,
 A. GREGORY.